No. 721,722. PATENTED MAR. 3, 1903.
W. H. MORTON.
STOPPER FOR NURSING BOTTLES.
APPLICATION FILED JUNE 23, 1902.
NO MODEL.
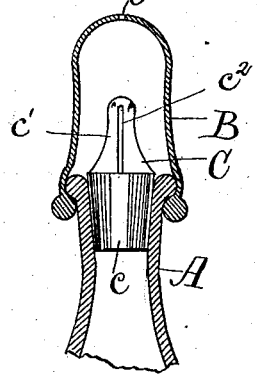
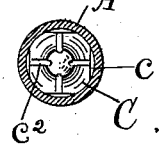
Witnesses:
Harry B. Reiss
Edward E. Dyer
Inventor,
William H. Morton
by S. W. Bates
Atty.

UNITED STATES PATENT OFFICE.

WILLIAM H. MORTON, OF PORTLAND, MAINE.

STOPPER FOR NURSING-BOTTLES.

SPECIFICATION forming part of Letters Patent No. 721,722, dated March 3, 1903.

Application filed June 23, 1902. Serial No. 112,847. (No model.)

*To all whom it may concern:*

Be it known that I, WILLIAM H. MORTON, a citizen of the United States of America, and a resident of Portland, Cumberland county, State of Maine, have invented certain new and useful Improvements in Stoppers for Nursing-Bottles, of which the following is a specification.

My invention relates to a stopper for nursing-bottles adapted to go inside of the nipple to control the supply of fluid from the bottle into the nipple.

It is a well-known fact that after a nipple is used for a short time the hole becomes so enlarged that the milk passes through into the stomach of the child much faster than it ought to pass for its proper digestion, and the result is that the child who feeds with such a nipple is apt to suffer from colic and wind on the stomach. The size of the hole in the nipple being the only guide to the amount of flow, it is liable to great variation, and it is to the proper regulation of this flow that my invention is directed.

The invention in its most approved form consists of a stopper adapted to fit the mouth of the bottle inside of the nipple and having portions cut away on its sides to form ducts for the passage of milk between the stopper and the sides of the mouth of the bottle. The stopper is provided with an elongation on its top, having longitudinal grooves or channels in its outer surface communicating with the above-described ducts, so that when the nipple collapses there will still be a passage through to the outlet of the nipple.

I illustrate my invention by means of the accompanying drawings, in which—

Figure 1 is a vertical section through the nipple and the mouth of the bottle, showing the stopper in elevation; and Fig. 2 is a plan of the stopper, showing the mouth of the bottle in section.

A represents the mouth of the bottle, and B is the nipple, having the usual hole $b$. The stopper C is inserted in the mouth of the bottle to regulate the flow of milk to the nipple. For this purpose it is provided with channels for the passage of the milk, and, as here shown, these passages are formed between the sides of the stopper and the inner surface of the mouth of the bottle by flat portions $c$, which are cut away from the sides of the stopper. These flat surfaces formed on the conical sides of the stopper form, when the stopper is inserted, flat ducts of greater or less area, according to the distance the stopper is pressed into the mouth of the bottle. For the purpose of preventing the nipple from collapsing and shutting off the flow of milk I provide an extension on the upper end of the stopper, (marked $c'$,) and in this extension I form longitudinal grooves $c^2$, communicating with the flat portions $c$, so that the milk will find its way out even when the nipple collapses.

By the use of my stopper the flow of milk is regulated with great accuracy without regard to the size of the hole in the nipple, so that the child will take its food slowly, and one nipple will last much longer than formerly, where they had to be changed when the hole became too large.

It is evident that the portion cut away from the stopper to allow the passage of milk may be otherwise than here shown, although I consider this form preferable. It will be seen that in the form here shown there are no interior passages through the stopper, so that there is no chance for the milk to clog, and the stopper may be kept clean very easily.

I claim—

1. In a nursing-bottle the combination of a nipple and a stopper inside of the nipple fitting in the neck of the bottle and having ducts to allow of the passage of liquid into the nipple.

2. In a nursing-bottle the combination of a nipple and a stopper inside of the nipple fitting in the mouth of the bottle and having portions cut away from the sides to form ducts for the passage of liquid between the stopper and the mouth of the bottle.

3. In a nursing-bottle the combination of a nipple and a stopper inside of the nipple fitting in the mouth of the bottle and having flattened portions on its sides to allow the passage of liquids between the stopper and the mouth of the bottle.

4. In a nursing-bottle the combination of a nipple and a stopper inside of the nipple fitting in the mouth of the bottle and having portions cut away from its sides to form ducts between the stopper and the mouth of the bottle for the passage of liquids and having a vertical extension provided with longitudinal channels communicating with said ducts.

Signed at Portland, Maine, this 17th day of June, 1902.

WILLIAM H. MORTON.

Witnesses:
 S. W. BATES,
 BENJ. G. WARD.